United States Patent [19]
Decker

[11] 3,920,354
[45] Nov. 18, 1975

[54] HORIZONTAL HINGED-FLAP WINDMILL
[76] Inventor: Bert J. Decker, 136 Capen Blvd., Buffalo, N.Y. 14226
[22] Filed: Aug. 30, 1974
[21] Appl. No.: 501,968

[52] U.S. Cl. ............... 416/117; 416/128; 416/140
[51] Int. Cl.² ........................................ F03D 3/02
[58] Field of Search .......... 416/110, 117, 128, 118, 416/119, 140; 290/44, 55

[56] References Cited
UNITED STATES PATENTS

| 469,786 | 3/1892 | Irrgang | 416/118 |
| 1,186,353 | 6/1916 | White | 416/41 |
| 1,371,204 | 3/1921 | Holt | 416/118 |
| 1,484,250 | 2/1924 | Barnes | 416/117 |
| 2,006,024 | 6/1935 | Lockwood | 416/110 |
| 2,129,652 | 9/1938 | Dean | 416/117 |
| 2,153,523 | 4/1939 | Roberts et al. | 290/55 |
| 2,177,801 | 10/1939 | Erren | 290/55 |
| 3,697,765 | 10/1972 | Carini | 290/55 |

Primary Examiner—Everette A. Powell, Jr.
Attorney, Agent, or Firm—Raymond F. Kramer

[57] ABSTRACT

A windmill which rotates in a horizontal plane about a vertical axis includes a plurality of aligned and usually overlapping flaps which move upwardly and downwardly about horizontal hinges to operating and feathered positions as the windmill rotates, with the flaps being held in operating or closed position, at which the force of the wind tends to rotate the mill, by the pressure of the wind against the flaps, which are prevented from feathering by restraining wires or net means, and moving to feathered position as they rotate and their positions are changed relative to the wind.

6 Claims, 8 Drawing Figures

HORIZONTAL HINGED-FLAP WINDMILL

This invention relates to horizontal windmills. More particularly, it relates to a windmill with flaps, sails or blades thereon which are self-feathering when they are moving against the wind and which otherwise resist the wind and convert its force to work.

For over a thousand years windmills have been employed to convert the strength of the wind to useful power or work. Especially today, when energy supplies are being recognized as limited, the non-pulluting, almost always available source of power in the wind is an important resource to be developed. In the past, although windmills have performed various useful tasks, including pumping water, generating power and operating machinery, such as grain milling stones, various problems have hindered mill development. Utilizing the well-known vertical plane, horizontal axis windmills, it has been necessary to employ rudder means to keep the mill facing into the wind so as to maximize power output and at comparatively low wind speeds the rudder might not be able to turn the windmill to the desired direction. To obtain a large working area for contact by the wind with conventional windmills it is necessary to increase the diameter to such as extent that at high speeds certrifugal force can imperil the continued safe operation of the mill. Horizontal windmills, while they may represent improvements in these respects over conventional vertical mills, have in the past had considerable drag imposed against their movements when the vanes, sails, flaps or louvers thereof would be moving against the wind. In some cases, mechanical devices could be employed to move the vanes into feathering or operating positions but such mechanims themselves have often been complex, expensive, unwieldy and inefficient. Problems of obtaining omnidirectional windmill operation, utilizing a self-feathering horizontal windmill, have been solved by the present invention.

In accordance with the present invention an improved windmill, effective omnidirectionally to convert wind power to mechanical power, comprises a plurality of flaps or blades which move between substantially horizontal feathered positions and substantially vertical operating positions, at which operating positions the force of the wind rotates the mill. In a more specific description of the invention the windmill has a vertical axis, a plurality of spokes or supports extending radially and horizontally outwardly from the axis, a plurality of filaments or wires or other equivalent means extending between the spokes, to act as stops against feathering movements of the windmill flaps when such movement is not desired and a plurality of hinge wires or equivalents extendings from the support or guide to the outermost of the wires between the spokes so as to form horizontal hinge supports for the flaps. In operation, when the wind blows against the mill, it blows the "venetian blind slats" into closed or operating position pressing against the vertical lines and/or other flaps, barring them from feathering, and turns the mill and/or axis around until those flaps are moving in the opposite direction, when they are lifted upwardly into approximately horizontal, feathered position by action of the wind, thereby diminishing the resistance to rotation.

The invention will be readily understood from the accompanying description, taken in conjunction with the drawings, in which.

Figure 1:
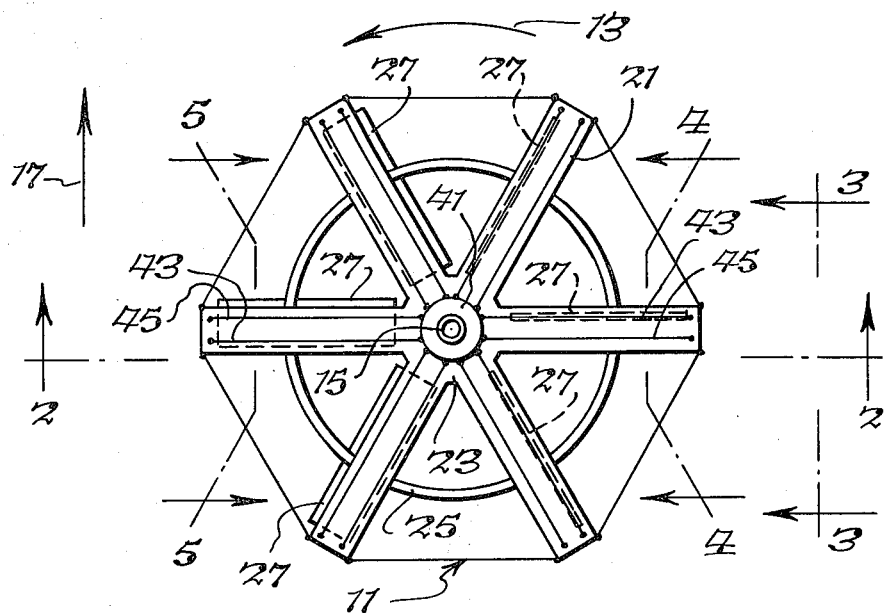
FIG. 1 is a top plan view of a horizontal hinged-flap windmill of this invention.

Windmill 11 is an omnidirectional, horizontal hinged-flap windmill which, as illustrated, rotates counterclockwise, when viewed from above, as shown by arrow 13, about central axis or shaft 15 when the wind blows in the direction indicated by arrow 17. As illustrated in FIG. 1, shaft 15 is a hollow cylinder and is stationary but in other embodiments it may rotate, being held in a concealed bearing below mount 19, and having the power take-off, generator or other power-utilizing device there, too. However, it is preferred that it be a stationary shaft, serving as a combination of mast and axle for the windmill. In such embodiments the shaft is anchored in the mount 19, which then represents a concrete pier.

Figure 3:
FIG. 3 is a side view of a bank of flaps or venetian blind slats of the invention in closed or operating position, illustrating locations of feathering stops for the flaps, as viewed along plane 3—3 of FIG. 1.
Figure 4:
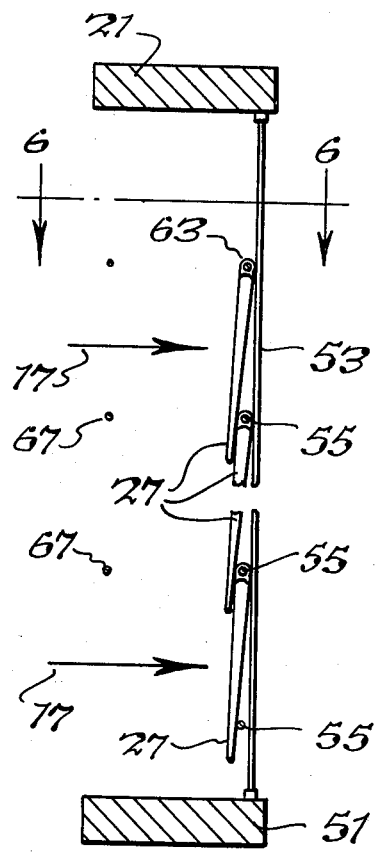
FIG. 4 is a discontinuous, partial sectional elevational view of the flaps of FIG. 3 in closed position, viewed along "plane" 4—4 of FIG. 1.

Radially extending arems or spokes 21 are connected to a hub 23 about shaft 15. In the illustration six spokes or arms of compression-resistant material are illustrated but it is evident that larger or smaller numbers may also be employed, e.g., 3 to 12. Preferably, 4 to 10 are used and most preferably 6 to 8. Instead of employing compression-resistant strong arms, a bicycle-type wheel can be used with the spokes being in tension, pulling the rim and and hub of the wheel together. Where, as in FIG. 3, it is evident that dual mountings are made on the spoke widths an equivalent wheel structure can be substituted, with two wires or spokes stretched along each radial part between the hub and the exterior of the windmill, a desired distance apart. Still, it is preferred to utilize arms such as those illustrated in FIG's. 1-3, which are sufficiently wide so as to allow the placement, as desired, of mounting hinges and feathering stops, which will be referred to later. Reinforcing ring 25 helps to hold the spokes or arms in desired position and takes some strain off the mountings thereof at hub 23.

As illustrated in FIG. 1 the three arms on the right side of the drawing have mounted thereon flaps, blades or sails 27 or other equivalent shapes or types of materials which resist the passage of wind and thereby tend to move objects to which they are attached when the wind blows at them. These are shown in operating position (vertical) so that with the wind blowing in the direction illustrated they tend to rotate the windmill in a counterclockwise direction. Flaps 27, three of which are shown on the left side of FIG. 1 in the feathered or horizontal position, do not provide much resistance to the wind and therefore, together with the pluralities of the flaps 27 attached to the other arms, result in counterclockwise movement of the windmill. Thus, from the structure illustrated it would be evident that no matter which direction the wind blows about half the number of any regularly positioned arms supporting pluralities of flaps will have the flaps therewith associated in the closed, operating position and the other half will have the flaps thereof in feathered position or, in some cases, "borderline" flaps will be moving intermediate such positions.

Figure 2:
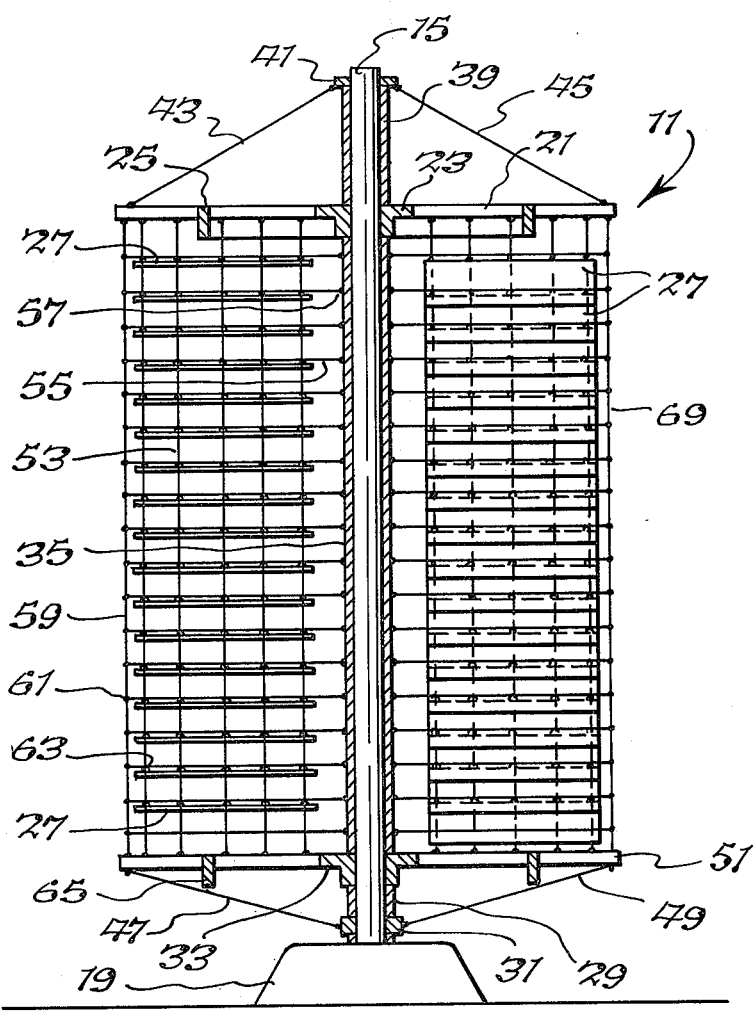
FIG. 2 is a partially sectional elevational view substantially along plane 2—2 of FIG. 1.

In FIG. 2 are illustrated mounting pier 19, tube or sleeve 29 having mounting collar 31 thereon, hub or flanged coupling 33, sleeve 35, another hub or flanged coupling 23, sleeve 39 and connector or mounting collar 41. All of these items, those identified by numerals 29, 31, 33, 35, 23, 39 and 41, combine to form the rotatable bearing or sleeve about the central mast-axle. They may be welded, keyed or screwed together or held together by other suitable means. Instead of using such structure one may employ other means for affixing or supporting elements of the windmill, as was indicated earlier, but those disclosed are preferred.

Figure 5:
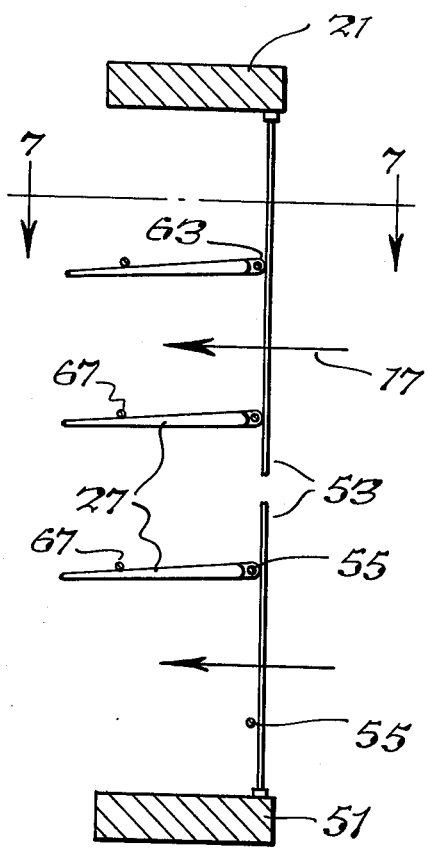
FIG. 5 is corresponding view of another set of flaps in opened or feathered position, viewed along plane 5—5 of FIG. 1.
Figure 6:
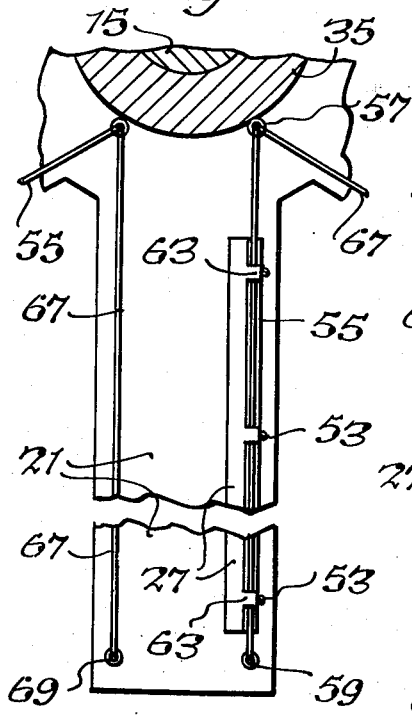
FIG. 6 is a discontinuous, partial sectional plan view taken along plane 6—6 of FIG. 4.
Figure 7:
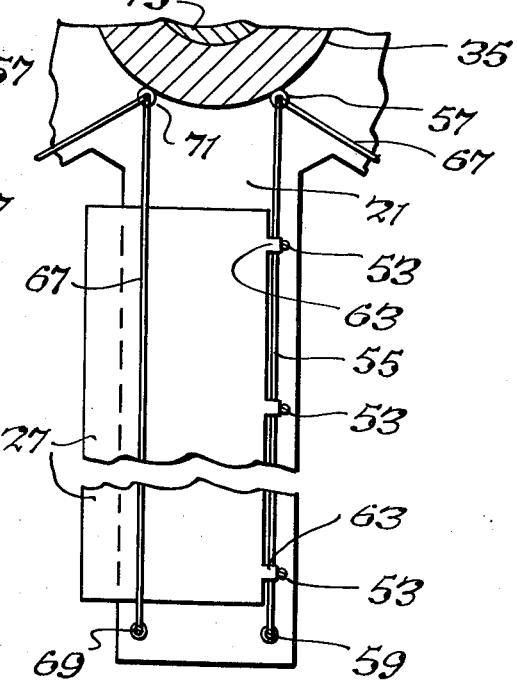
FIG. 7 is a corresponding view taken along plane 7—7 of FIG. 5.

At the vertical extremes of the windmill are supporting wires 43 and 45, which help to support various arms 21 of the upper structure and the corresponding parts of the lower assembly. At the bottom of the windmill wires 47 and 49 help to pull spokes or arms 51 downwardly, maintaining desired tension on them to compensate for upward pulls toward spokes 21, with which the arms are connected by wires 53. Strengthening ring 65 reinforces the bottom spokes or arms in the same manner that ring 25 strengthens arms 21. Sleeves 29 and 39 act as convenient spacers and mounting means but sleeve 35 has another important function, as a supporting means for mounting horizontal wires 55 at joints, connectors or holders 57, said wires also being joined to outermost vertical wires 59 at joints 61. Additionally, sleeve 35 maintains the hubs 23 and 33 as given distance apart, preventing a "winding up" movement of the mill, as part thereof could otherwise twist about the mast 15 during rotation. Flaps 27 are hinged about horizontal wires 55 by means of hinges 63, details of which are shown more clearly in FIG'S. 4–7. Thus, when the wind is blowing in the direction shown in FIG. 1 the flaps, which are hinged on horizontal wires 55, will move before the wind about wires 55 to a closed position, as illustrated in FIG'S. 3 and 4, in which the flaps are shown contacting each other (or they can also be stopped by the horizontal wires). When the flap has moved 180° or to the "feathering" position, where the direction of the wind is reversed, as illustrated in FIG. 5, the wind moves the flap upwardly until it contacts horizontal restraining wire 67 which is supported by terminal vertical wires 69. FIG'S. 6 and 7 illustrate the flaps in closed, operating position and in feathered positions, respectively. An eye 71 or other suitable attachment means for horizontal stop wire 67 is illustrated on sleeve 35.

Figure 8:
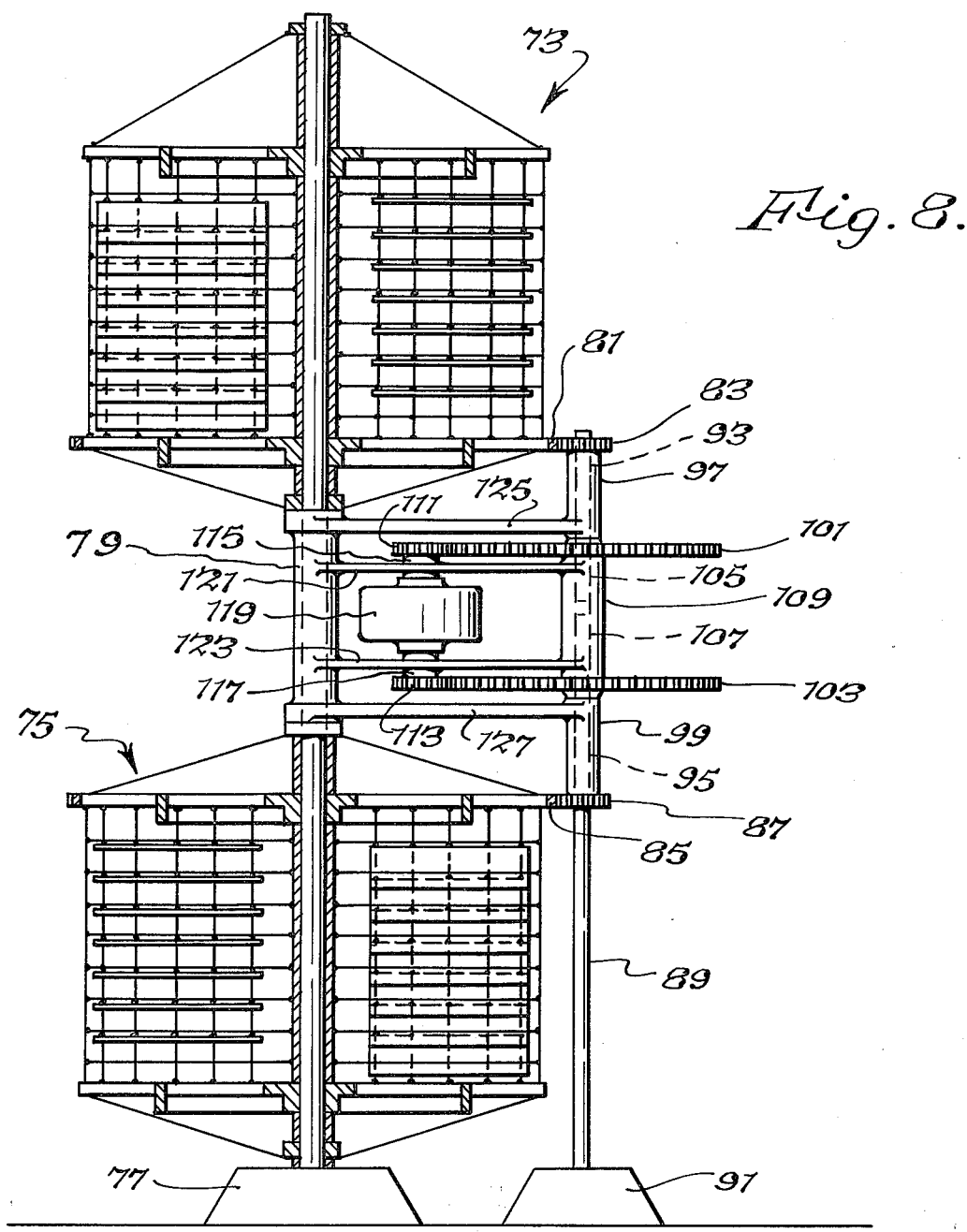
FIG. 8 is a partially sectional front elevational view corresponding to that of FIG. 1 but showing a pair of counter-rotating windmills connected to an electric generator.

In FIG. 8 counter-rotating windmills 73 and 75 are mounted on a single shaft. The mills are of the structure illustrated in FIG'S. 1–7 with the exceptions that they each possess fewer series of flaps, the upper mill has the flap-stop combinations so located as to cause it to turn clockwise and means are provided to take off mechanical power from each of the mills and transmit it to different parts of the same electrical generator, with one mill turning the rotor thereof and the other turning the "stator." Thus, mill 73 has a ring gear 81 which drives spur gear 83 to turn shaft 93 in housing 97 and thereby turn gear 101, which drives meshing gear 111, turning hub 115 and the stator, not shown, of generator 119. Similarly, with respect to windmill 75, external gearing 85 drives spur gear 87, which turns shaft 95 in mount 99 to rotate large gear 103 which meshes with generator drive gear 113, which turns hub 117 and the rotor, not shown, of generator 119. Extensions 105 and 107 of shafts 93 and 95 are shown in housing 109 to give greater stability and trueness to the shafts. The gearing arrangement is maintained in proper relationship by means of a housing 79, stabilizing and connecting ribs 125, 121, 123 and 127 and other housing elements 97, 109 and 99, which are held together and which are additionally supported by rod or tube 89 and pier 91. The central shaft of the dual windmill combination is supported by pier 77.

In operation, when the wind blows against the mill of the type shown in FIG. 1, no matter which direction it comes from, the windmill turns counterclockwise. The sails or flaps not being held up by the wind fall of their own weight at lest part way and then are pressed downwardly by the wind so that they contact the hinge wires, or as is usually the case, other such flaps, and are maintained inclosed position, resisting the wind and causing the mill to turn. When that section of the mill has rotated to a point where the wind blowing against the flaps lifts them upwardly, they are feathered and do not resist the wind, thereby providing a differential of forces which causes the windmill to turn. Of course, the stop wires prevent the flaps from moving too far upwardly, which would have the undesirable effect of providing resistance to the desired turning of the mill and might lead the flaps to close in a position wherein the free ends thereof or of some of them would be upward rather than downward. The stops also steady all the feathered flaps in the same position, making for most efficient feathering. Among the advantages of the present mill is that as soon as the varous arms or spokes are in position wherein the wind can blow against them to close the flaps this closing occurs and the mill is generating power. Also as soon as the wind can blow against the flaps to feather them, this happens, causing a reduction of drag. Thus, for a full 180° of the position of the mill it is producing powere with the flaps being at maximum receptive position (for radially positioned vanes).

In the two unit combination mill of FIG. 8 the different directions of rotation of the mills help to to balance the combination of the supporting shaft, preventing development of an unbalanced torque. A greater velocity differential is obtained by having one mill drive the stator and the other the rotor of the generator. In such case the velocity of each part is only half what the velocity would have to be for the rotor with a stationary stator. This leads to improved anti-friction properties and easier maintenance of lubrication and has the other usual advantages associated with operating moving parts at lower speeds. Of course, other mechanisms for transmitting the motions of the windmills to generators, power take-offs and machines may also be employed, that illustrated being somewhat diagrammatic. Similarly, different numbers of windmills may be placed on the same vertical shaft and in some embodiments of the invention the principal illustrated may be modified by turning the hinges and the flaps 90°, so that they are vertical, rather than horizontal and with the hinges on the outside, away from the central vertical shaft. Wind tunnel tests may be employed to determine the better type of construction for a particular situation.

The materials of construction for the present windmill are readily available and are comparatively inexpensive. The supporting piers may be concrete or steel and the mast may be steel, aluminum, magnesium alloy or of other suitable metal. Similarly, the sleeves, collars, hubs and arms or spokes may also be of such metals. Alternatively, the arms may also be of wood. Obviously, where suitable, synthetic organic polymeric materials such as the thermoplastic and thermosetting polymers, generally known as plastics, may be employed, preferably with fibrous reinforcements therein, e.g., glass fiber reinforced polyesters. The various wires utilized may be monofilamentary, multifilamentary, braided or of other types and may be covered with a suitable protective sleeve or coating, if desired. Instead of metal wires, plastics may be employed, e.g., nylon. The flaps or sails may be of cloth, polymeric film material, e.g., polyethylene or polypropylene, held in a suitable frame, or may be metal sheets, preferably of aluminum, or of plastic, preferably fiber reinforced polyester. The hinged portions of the flaps may be of bent metal, molded plastic or of cast material. Of course, the various fasteners and bearings may be of conventional design and parts may be held together by usual means, such as bolting, welding, fusing (for plastics), adhesives, riveting and clamping.

Despite the size of the windmill (it may often be as high as ten meters, although it will normally be from 2 to 5 meters tall, it is lightweight, due to its design, especially because of the use of thin flap members and tension wires for structure, hinge supports and stops and because of its generally openwork construction. Thus, even larger units can be made without unduly increasing the weight of the windmill and therefore the mill of this invention produces less frictional resistance to movement. The various wires which support the hinges for the flaps and act as stops also help strengthen the structure of the windmill, thus additionally conserving weight. However, if desired, one may replace the individual wires with screens, nets, open cloths or subcombinations of various wires, e.g., nylon filament nets, but steel wires are preferred, at least for the stops which are repeatedly contacted by the flaps or sails.

The windmill, whether a single, plural or multiple form thereof is employed, may be connected by any suitable means to drive machinery, pump water, generate electricity or perform other known mill functions. Such connections may be by gearing, belting, frictional contact with a rotating part or any other suitable method known in the art. Whatever type of apparatus is driven the windpower made available by the mill is efficiently produced, which is especially attributable to the low weight of the structure and the fact that more power is produced per pound of structure than with other heavier devices. In large part, the saving in weight is due to the light weight of the various structural members employed and much of this is due to the light weight of the thin tension wires, which exert great structural forces per unit weight thereof. Such savings are also the result of the use of the wires as hinge elements about which the flap or sail moves from vertical wind-catching position to a horizontal non-catching or feathering position.

In the foregoing specification references have been made to relative positions of various parts of the windmill as being horizontal or vertical. It should be understood that although these terms are preferably absolute they may extend to include substantially horizontal and substantially vertical locations too. Thus, angles within up to 15° of the horizontal, preferably 0° to 5° and most preferably within about 2° are included within the term horizontal or in operative circumstances, are considered to be the equivalents thereof. Thus, substantially horizontal would mean horizontal ±15°. Horizontal would preferably indicate a variation of no more than ±5°. Similar terminology and variations are to be considered as applying to vertical and substantially vertical.

The invention has been described with respect to illustrations and descriptions of preferred embodiments thereof but is not intended to be limited to these because it is evident that one of skill in the art, with the present specification before him, will be able to utilize substitutes and equivalents without departing from the spirit of the invention.

What is claimed is:

1. A horizontal windmill which comprises a plurality of flaps or blades which move between feathered positions and operating positions, said flaps each being hinged at a side thereof and so located that when in operating position the flaps or blades overlap, with a side of one flap being pressed against the hinged portion of an adjacent flap, wire mounting means for the flaps on which the hinges are mounted and wire stop means for limiting the motion of the flaps when in feathered position, against which stop means the sides of such flaps bear, which sides are opposite to the sides bearing against the hinge portions of the adjacent flaps in operating position.

2. A windmill according to claim 1 in which the flaps or blades move between substantially horizontal feathered positions and substantially vertical operating positions at which the force of the wind rotates the mill, which has a vertical axis and in which said flaps are hinged horizontally and rotate about such axis in a horizontal plane.

3. A windmill according to claim 2 wherein the flaps are situated in a plurality of banks so that they overlap in operating position, in which they are substantially vertical, so as to inhibit the passage of wind between them, and which includes axial guiding and/or supporting means, a plurality of hubs about said guiding means, a plurality of arms or spokes radiating from said plurality of hubs and thin wire, thread or filament means connecting such arms on one hub with other such arms on another hub to hold the flaps closed in operating position and to allow air to pass readily through those sections in the feathered position, with horizontal wires serving as stops for the flaps or blades to prevent overfeathering thereof.

4. A windmill according to claim 3 wherein the spokes are of rigid material, upper and lower spokes are held together by vertical wires in tension, which wires support horizontal wires on which the flap hinges are mountd and which spokes include additional vertical wires in tension offset from said first set of vertical wires, which second set of wires supports horizontal feathering-stopping wires, which horizontal feathering-stopping wires are free of contacting vertical wires for the widths of the flaps or blades.

5. A windmill according to claim 1 which includes separate sets of wires, one of which sets is for mounting said hinged flaps and another of which sets is for preventing overfeathering of such flaps, which sets of wires are mounted between a pair of parallel horizontal spokes.

6. A windmill according to claim 1 wherein the flaps or blades are made of material selected from the group consisting of polyethylene, polypropylene, aluminum and fiber reinforced polyester.

* * * * *